(12) United States Patent
Brebion et al.

(10) Patent No.: US 11,277,456 B2
(45) Date of Patent: Mar. 15, 2022

(54) SYSTEM AND METHOD FOR DELIVERING AN AUDIO-VISUAL CON TENT TO A CLIENT DEVICE

(71) Applicant: BROADPEAK, Rennes (FR)

(72) Inventors: Rémy Brebion, Rennes (FR); Dominique Colombel, Sixt-sur-Aff (FR); Jacques Le Mancq, Saint Jean sur Vilaine (FR)

(73) Assignee: BROADPEAK, Rennes (FR)

( * ) Notice: Subject to any disclaimer, the term of this patent is extended or adjusted under 35 U.S.C. 154(b) by 425 days.

(21) Appl. No.: 14/424,661

(22) PCT Filed: Aug. 19, 2013

(86) PCT No.: PCT/EP2013/067250
§ 371 (c)(1),
(2) Date: Feb. 27, 2015

(87) PCT Pub. No.: WO2014/033003
PCT Pub. Date: Mar. 6, 2014

(65) Prior Publication Data
US 2015/0229685 A1 Aug. 13, 2015

(30) Foreign Application Priority Data

Aug. 27, 2012 (EP) .................................... 12306026

(51) Int. Cl.
*H04L 29/06* (2006.01)
*H04L 65/60* (2022.01)
(Continued)

(52) U.S. Cl.
CPC ............ *H04L 65/60* (2013.01); *H04L 65/102* (2013.01); *H04L 65/4076* (2013.01);
(Continued)

(58) Field of Classification Search
CPC ....................................................... H04L 65/60
(Continued)

(56) References Cited

U.S. PATENT DOCUMENTS 6,542,933 B1 * 4/2003 Durst, Jr. .......... G06F 17/30879
707/999.009
6,865,605 B1 * 3/2005 Soderberg ............. H04L 67/327
707/E17.032

(Continued)

FOREIGN PATENT DOCUMENTS

EP         0902569 A1      3/1999
WO      2012/000165 A1      1/2012
WO   WO 2012000165 A1 *    1/2012    ........... H04L 12/189

OTHER PUBLICATIONS

Sep. 25, 2013 Search Report issued in International Application No. PCT/EP2013/067250.
(Continued)

*Primary Examiner* — Joon H Hwang
*Assistant Examiner* — Sherman Lin
(74) *Attorney, Agent, or Firm* — Oliff PLC; R. Brian Drozd

(57) ABSTRACT

For delivering an audio-visual content to a client device, an interconnecting device interconnecting a first network to a second network, the client device being connected to the second network, an equipment adapted to provide the audio-visual content being connected to the first network, said equipment performs: receiving, from the client device, a first request for receiving the audio-visual content; transmitting a redirecting message to the client device, said redirecting message redirecting the client device toward an agent implemented in the interconnecting device. Furthermore, said agent performs: receiving, from the client device, a second (Continued)

Figure 1A:
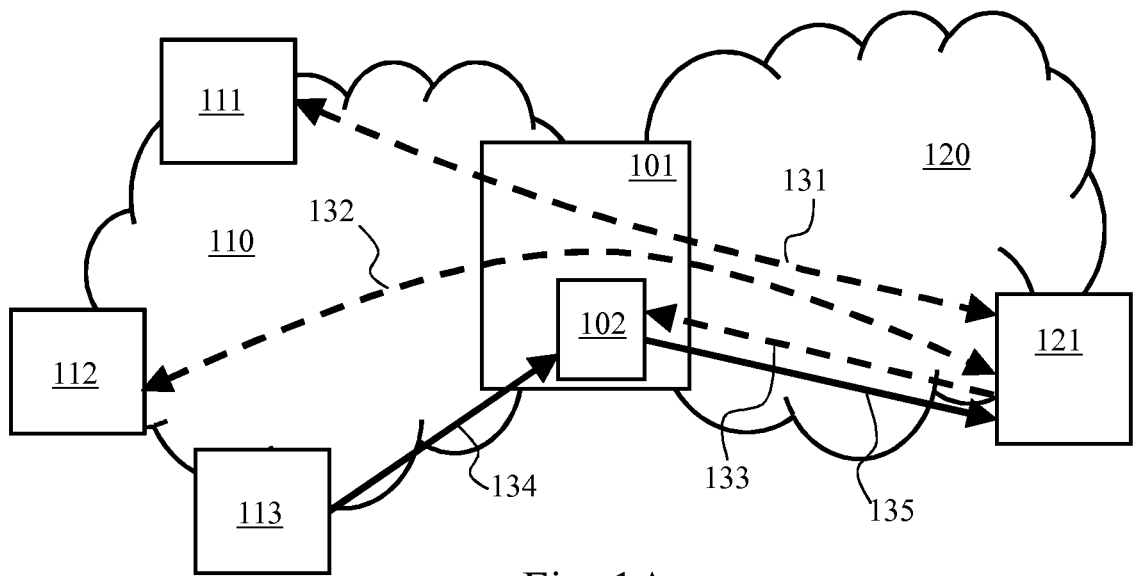

request for receiving the audio-visual content; acting as a relay between said equipment and the client device.

13 Claims, 5 Drawing Sheets

(51) Int. Cl.
  *H04L 65/102* (2022.01)
  *H04L 65/612* (2022.01)
  *H04L 65/611* (2022.01)
  *H04L 67/563* (2022.01)
  *H04L 67/02* (2022.01)
  *H04L 67/10* (2022.01)
  *H04L 67/01* (2022.01)

(52) U.S. Cl.
  CPC .......... *H04L 65/4084* (2013.01); *H04L 67/02* (2013.01); *H04L 67/10* (2013.01); *H04L 67/2814* (2013.01); *H04L 67/42* (2013.01)

(58) Field of Classification Search
  USPC ................................................ 709/202, 217
  See application file for complete search history.

(56) References Cited

U.S. PATENT DOCUMENTS

| | | | | |
|---|---|---|---|---|
| 2002/0143951 | A1* | 10/2002 | Khan | .................... H04L 12/185 |
| | | | | 709/227 |
| 2004/0054779 | A1* | 3/2004 | Takeshima | ........ G06F 17/30569 |
| | | | | 709/225 |
| 2008/0120501 | A1* | 5/2008 | Jannink | ............. G06F 17/30017 |
| | | | | 713/163 |
| 2010/0238924 | A1* | 9/2010 | Liu | ...................... G06Q 10/087 |
| | | | | 370/390 |
| 2011/0069705 | A1 | 3/2011 | Glasser et al. | |

OTHER PUBLICATIONS

Sep. 25, 2013 Written Opinion issued in International Application No. PCT/EP2013/067250.

Mar. 3, 2015 International Preliminary Report on Patentability issued in International Application No. PCT/EP2013/067250.

Oct. 25, 2016 Written Opinion issued in Singapore Patent Application No. 11201501473T.

* cited by examiner

SYSTEM AND METHOD FOR DELIVERING AN AUDIO-VISUAL CON TENT TO A CLIENT DEVICE

The present invention generally relates to delivering an audio-visual content to a client device, an interconnecting device interconnecting a first network to a second network, the client device being connected to the second network, an equipment adapted to provide the audio-visual content being connected to the first network.

Adaptive Bitrate Streaming (ABS) is one popular HTTP streaming technique used in streaming multimedia over computer networks and HLS ("HTTP Live Streaming"), which is a media streaming communications protocol based on HTTP ("HyperText Transfer Protocol", as defined in the normative document RFC 2616) and developed by Apple Inc. is one particular implementation. HLS works by breaking the overall AV stream into a sequence of small HTTP-based file downloads, each containing one short chunk of an overall potentially unbounded transport stream. As the stream is played, a client device decoding the AV stream may select from a number of different alternate streams containing the same material encoded at a variety of bit rates, allowing the streaming session to adapt to the available network resources and/or processing resources of the client device. At the start of the streaming session, the client device downloads a playlist in the form of a text file with an M3U, or m3u8, file extension. This text file contains the metadata for the various streams which are available for the concerned AV content. The various streams that correspond to the respective bit rates are also referred to as layers.

A similar ABS approach is implemented by Smooth Streaming, which is a feature of Internet Information Services (IIS) Media Services, an integrated HTTP-based media delivery platform provided by Microsoft Corp. Contrary to HLS wherein the AV stream is truncated in plural files containing chunks complemented with playlist files, Smooth Streaming relies on a single AV file truncated into pieces, each piece of file containing a descriptor indicating the concerned layer and a reference time in the AV content. Protocol basis and benefits are however equivalent.

One may similarly consider Adobe Systems' HTTP Dynamic Streaming (HDS) and Dynamic Adaptive Streaming over HTTP, a multimedia streaming technology developed by the Moving Picture Experts Group, and referred to as MPEG DASH, which is related to HDS, HLS and Smooth Streaming.

HTTP-based streaming technologies are very convenient, as HTTP allows going through firewalls and guarantees data integrity by relying on TCP ("Transmission Control Protocol", as defined by the normative document RFC 793). However, the unicast nature of HTTP in the context of ABS is creating huge scalability issues for Content Delivery Network (CDN) operators that prevent them from adopting ABS for live streaming. Moreover, TCP can introduce latency and a connection loss during a data transfer has a strong impact on Quality of Experience (QoE) from the user's standpoint.

In order to perform ABS for live streaming in a scalable way, there is a need for network service operators to resolve the scalability issue created by numerous users watching simultaneously a same channel, which results in numerous concurrent unicast sessions.

It shall be noted that such issues arise in the more general context of audio-visual contents delivery based on unicast sessions, whatever the bitrate of streams transporting the audio-visual contents be adaptive or fixed.

In a more general approach, issues are raised when the CDN operators provide, or envisage to provide, new infrastructure or services in the CDN, whereas the client devices rely on existing mechanisms. Upgrading the client devices to adopt the new infrastructure and/or services might be difficult to setup, as client devices are typically developed by other parties than the CDN operators. Indeed, contrary to gateways such client devices are for instance application software, developed by companies that are independent from the CDN operators, running on smartphones, tablets, PCs (Personal Computer) game consoles, connected TVs, etc. and many applications, or players, exist on the marketplace, which would require costly integration and validation processes to allow all applications, or players, to be compatible with said new infrastructure or services.

According to a first aspect, such new infrastructure or services aim at overcoming the aforementioned scalability issues related to the unicast nature of existing content delivery mechanisms in the context of CDNs, in a transparent manner for the client devices.

According to a second aspect, such new infrastructure or services aim at providing an enhanced QoE from the user's standpoint, in a transparent manner for the client devices. For instance, such new infrastructure or services aim at overcoming connection loss impacts on QoE during the delivery of the AV content.

It is desirable to overcome the aforementioned drawbacks of the prior art.

In particular, it is desirable to provide a solution that allows adopting new infrastructure or services in the context of an audio-visual content delivery, in a transparent manner for client devices.

Furthermore, it is desirable to provide a solution that allows reducing the network bandwidth consumption in the context of an audio-visual content delivery, in a transparent manner for client devices.

It is furthermore desirable to provide a solution that allows reducing the network bandwidth consumption in the further context of adaptive bitrate streaming, in a transparent manner for client devices.

Furthermore, it is desirable to provide a solution that allows increasing the QoE from the user's standpoint, in a transparent manner for the client devices.

It is furthermore desirable to provide a solution that allows limiting processing resources consumption of devices implied in the delivery of the audio-visual content.

To that end, the present invention concerns a method for delivering an audio-visual content to a client device, an interconnecting device interconnecting a first network to a second network, the client device being connected to the second network, an equipment adapted to provide the audio-visual content being connected to the first network. The method is such that said equipment performs: receiving, from the client device, a first request for receiving the audio-visual content; transmitting a redirecting message to the client device, said redirecting message redirecting the client device toward an agent implemented in the interconnecting device. The method is further such that said agent performs: receiving, from the client device, a second request for receiving the audio-visual content; and acting as a relay between said equipment and the client device.

Thus, thanks to the redirecting toward an agent in the interconnecting device, adopting new infrastructure or services is made easier and in a transparent manner for client devices. Indeed, performing upgrade when necessary of the interconnecting device is generally easier for the CDN operators than upgrading the client devices, as such interconnecting devices, e.g. home gateways, are generally managed by operators, contrary to said client devices.

According to a particular feature, said first and second requests are requests for receiving the audio-visual content in the form of a unicast stream, said equipment is adapted to provide the audio-visual content in live streaming, said equipment transmits the redirecting message to the client device when the audio-visual content is made available by said equipment in the form of at least one multicast stream, and when acting as a relay, said agent performs: joining said at least one multicast stream; converting data received in the form of the at least one multicast stream into data in the form of the unicast stream.

Thus, the bandwidth consumption for the first network is reduced, while processing resources consumption of the interconnecting device is limited. Indeed, as the agent is not required to snoop numerous message exchanges in order to ensure that the client device take benefit of setting up multicast transmissions throughout the first network, the processing resources consumption is limited.

According to a particular feature, the redirecting message includes parameters notifying at least one multicast address and at least one associated port, and the request for receiving the audio-visual content in the form of the unicast stream comprises said parameters notifying the at least one multicast address and the at least one associated port. The method is further such that said agent joins at least one multicast stream corresponding to the at least one multicast address and the at least one associated port.

Thus, the method is flexible and scalable, independently of the effective location and implementation of said equipment.

According to a particular feature, the redirecting message includes parameters notifying a quantity of layers made available for the audio-visual content in the form of at least one multicast stream, and the request for receiving the audio-visual content in the form of the unicast stream includes said parameters notifying the quantity of layers. Furthermore, said agent determines at least one multicast address and/or at least one associated port, as a function of said quantity of layers.

Thus, multicast transmissions throughout the first network and adaptive bitrate streaming principles can co-exist for the delivery of the audio-visual content.

According to a particular feature, the redirecting message includes parameters notifying one multicast address and one associated port and notifying said quantity of layers, and the request for receiving the audio-visual content in the form of the unicast stream includes said parameters notifying said one multicast address and said one associated port and notifying said quantity of layers. Furthermore, said agent determines one multicast address per layer and one associated port, as a function of said quantity of layers and of said one multicast address and said one associated port included in said request.

According to a particular feature, the redirecting message includes parameters notifying one multicast address and one associated port and notifying said quantity of layers, and the request for receiving the audio-visual content in the form of the unicast stream includes said parameters notifying said one multicast address and said one associated port and notifying said quantity of layers. Furthermore, said agent determines one multicast address for all layers and one associated port per layer, as a function of said quantity of layers and of said one multicast address and said one associated port included in said request.

Thus, the two previous particular features allow limiting the amount of data to be included in the redirecting message.

According to a particular feature, plural layers being made available for the audio-visual content in the form of at least one multicast stream, said equipment being adapted to provide the audio-visual content using HyperText Transfer Protocol Live Streaming: the redirecting message includes parameters representative of a Uniform Resource Locator related to a playlist for the audio-visual content; the request for receiving the audio-visual content in the form of the unicast stream includes said parameters representative of the Uniform Resource Locator. Furthermore, said agent performs: requesting said playlist on the basis of said Uniform Resource Locator; receiving said playlist; performing a parsing operation on said playlist for determining one layer playlist associated with each layer; receiving one layer playlist from each joined multicast stream; transmitting said received playlist(s) to the client device; receiving a request, from the client device, indicating a playlist associated with one layer or indicating a file of a playlist associated with one layer; and, selecting a multicast stream as a function of said indicated playlist associated with one layer or of said indicated file.

Thus, the bandwidth consumption for the first network is reduced, while processing resources consumption of the interconnecting device is limited, in the context of HLS.

According to a particular feature, plural layers being made available for the audio-visual content in the form of at least one multicast stream, the agent having joined one multicast stream corresponding to one layer, said agent performs: detecting a need for the client device to switch from said one layer to another layer; joining a multicast stream corresponding to said another layer; leaving the multicast stream corresponding to said one layer.

Thus, a trade-off between bandwidth consumption and system reactivity is found, wherein the bandwidth consumption concerning the first network is improved.

According to a particular feature, plural layers being made available for the audio-visual content in the form of at least one multicast stream, the agent having joined at least two multicast streams corresponding respectively to one layer and another layer, said agent performs: detecting a need for the client device to switch in between layers; selecting data from one multicast stream among said at least two multicast streams, as a function of said detected need.

Thus, a trade-off between bandwidth consumption and system reactivity is found, wherein reactivity is improved.

According to a particular feature, said first and second requests are requests for receiving the audio-visual content in the form of a unicast stream, said equipment transmits the redirecting message to the client device when the audio-visual content is made available by plural sources, and when acting as a relay said agent performs: requesting said audio-visual content from said plural sources; and recreating a unicast stream from data received from said plural sources.

Thus, QoE is improved from the standpoint of a user using the client device, while processing resources consumption of the interconnecting device is limited, and/or load balancing on the first network is improved.

According to a particular feature, the redirecting message includes parameters notifying from which sources the audio-visual content is made available; and the request for receiving the audio-visual content in the form of the unicast stream comprises said parameters.

Thus, the method is flexible and scalable, independently of the effective location and implementation of said plural sources.

According to a particular feature, said interconnecting device is a home gateway and said plural sources are servers of said equipment and/or other home gateways.

Thus, load balancing can be further improved.

According to a particular feature, the redirecting message indicates a temporary relocation of the audio-visual content.

Thus, it allows, when the client device would make a later attempt to get the audio-visual content, ensuring that the client device contact again said equipment. Therefore, said equipment is able to check whether the audio-visual content is still made available in the form of at least one multicast stream.

The present invention also concerns a system for delivering an audio-visual content to a client device, said system comprising an equipment and an interconnecting device, said interconnecting device aiming at interconnecting a first network to a second network, the client device being connected to the second network, said equipment being adapted to provide the audio-visual content and aiming at being connected to the first network. The system is further such that said equipment comprises: means for receiving a first request for receiving the audio-visual content; means for transmitting a redirecting message, said redirecting message aiming at redirecting the client device toward an agent implemented in the interconnecting device. The system is further such that said agent comprises: means for receiving a second request for receiving the audio-visual content; means for acting as a relay between said equipment and the client device.

The present invention also concerns a computer program that can be downloaded from a communication network and/or stored on a medium that can be read by a processing device. This computer program comprises instructions for causing implementation of the aforementioned method, when said program is run by a processor. The present invention also concerns information storage means, storing a computer program comprising such a computer program.

Since the features and advantages related to the aforementioned system and to the computer program are identical to those already mentioned with regard to the corresponding aforementioned method, they are not repeated here.

Figure 1B:
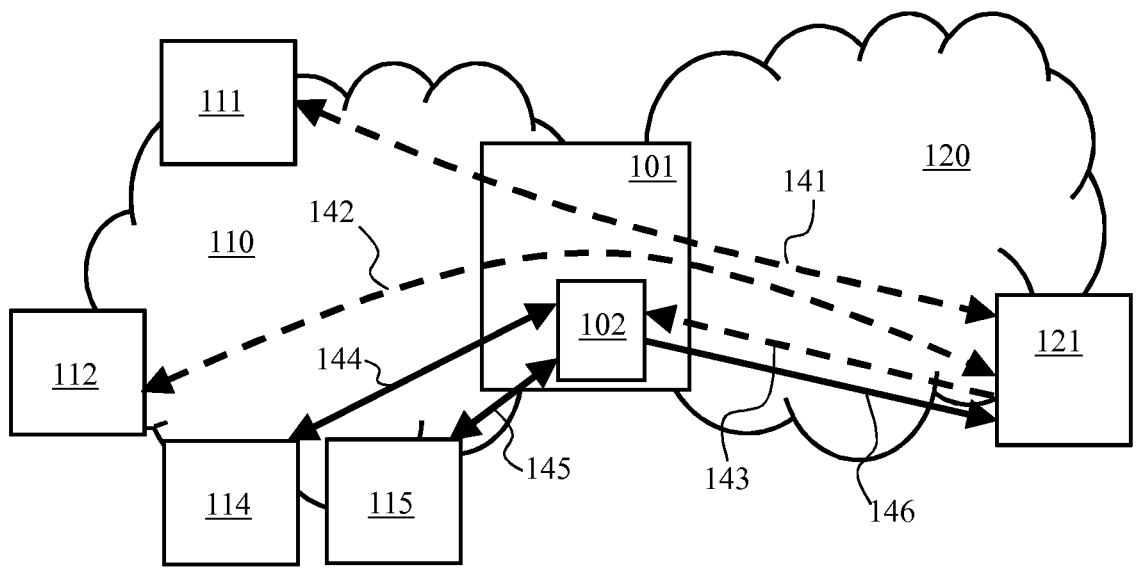
Figure 2:
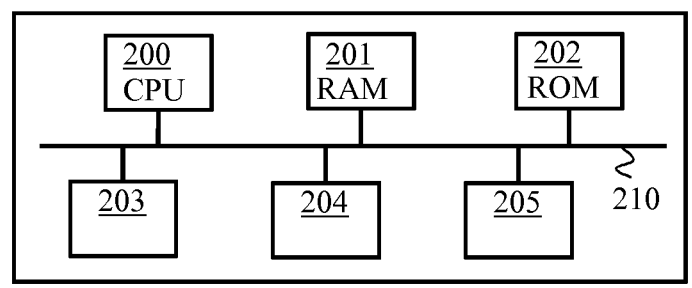
Figure 3:
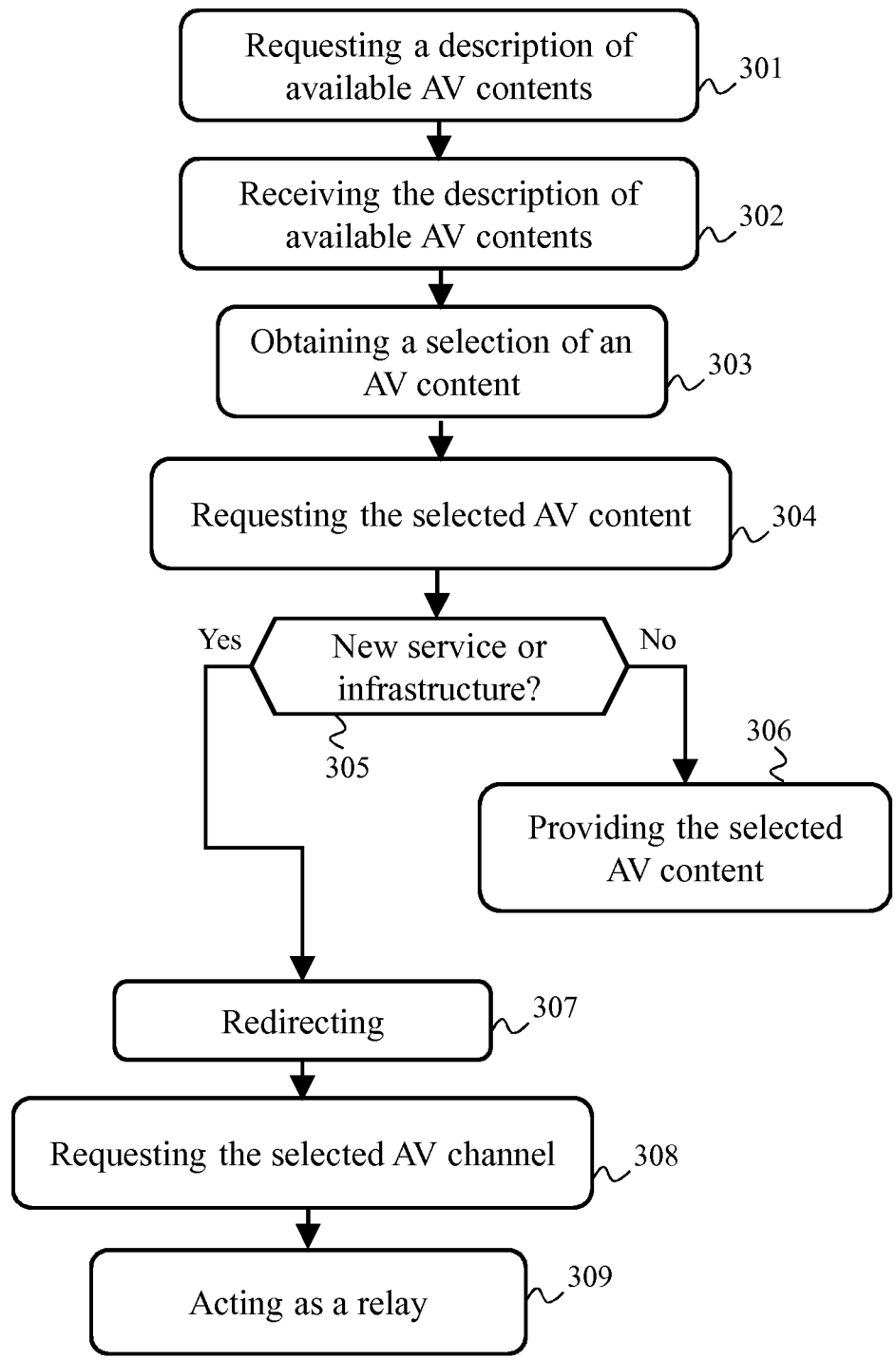
Figure 4:
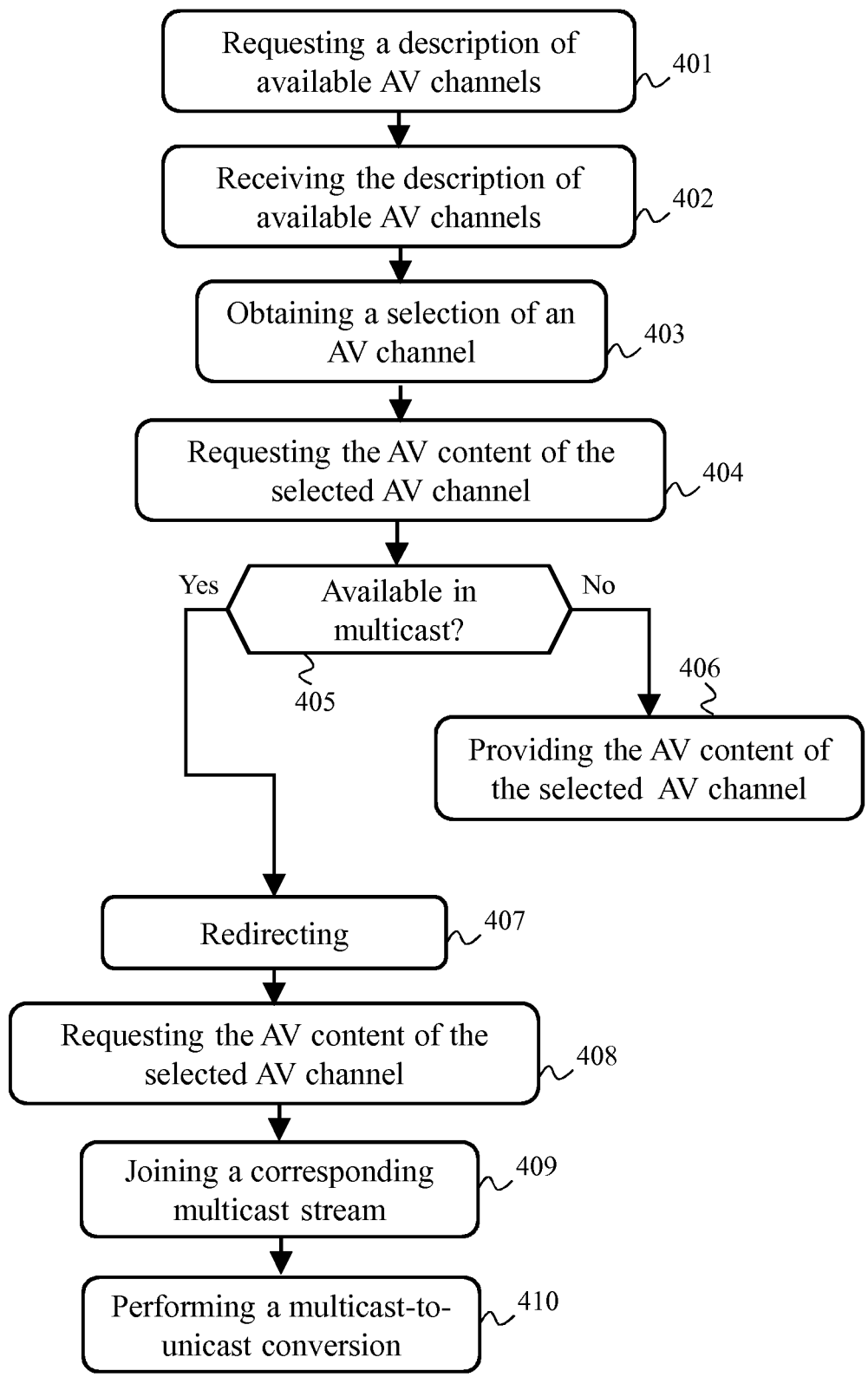
Figure 5:
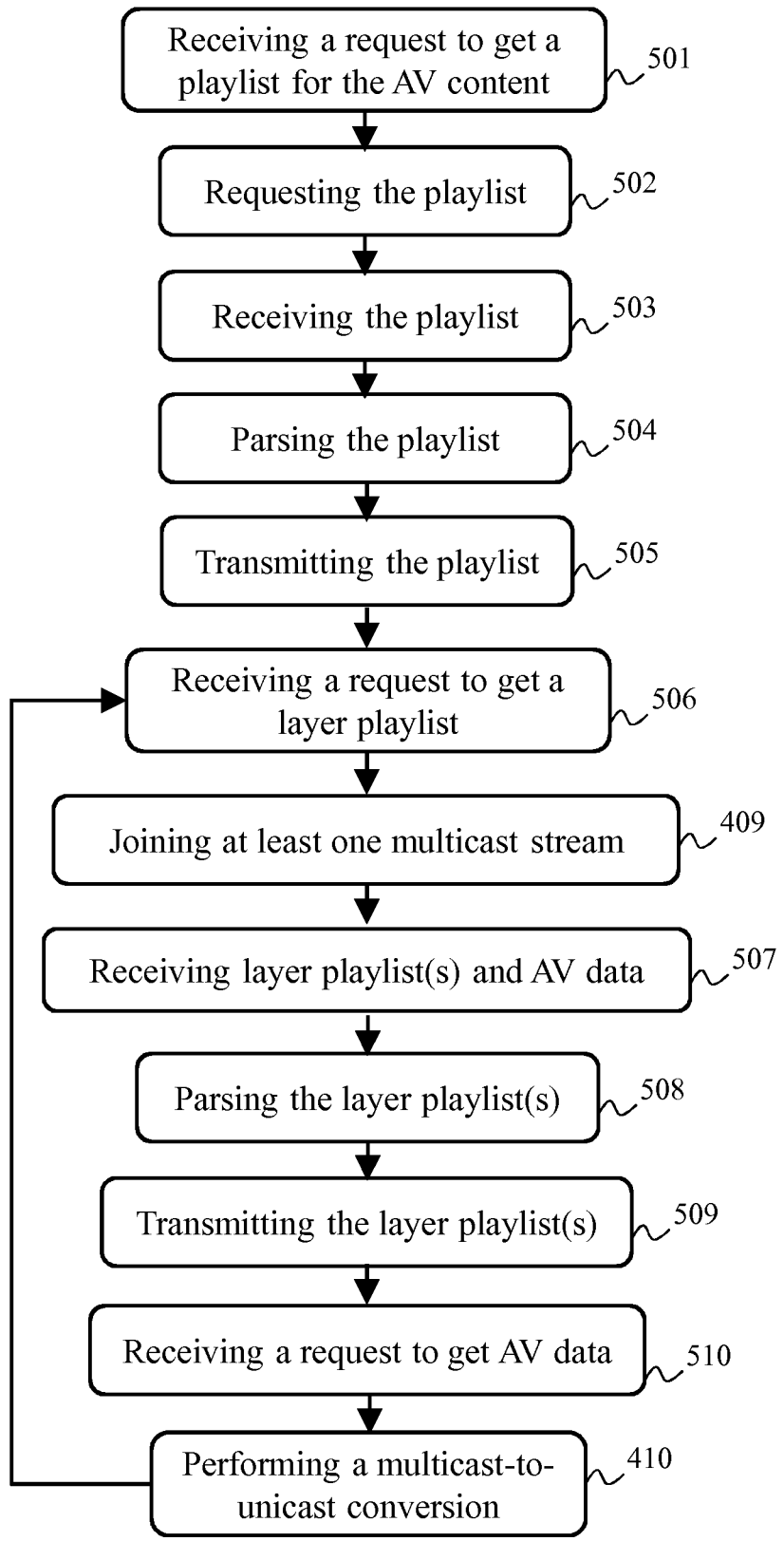
Figure 6:
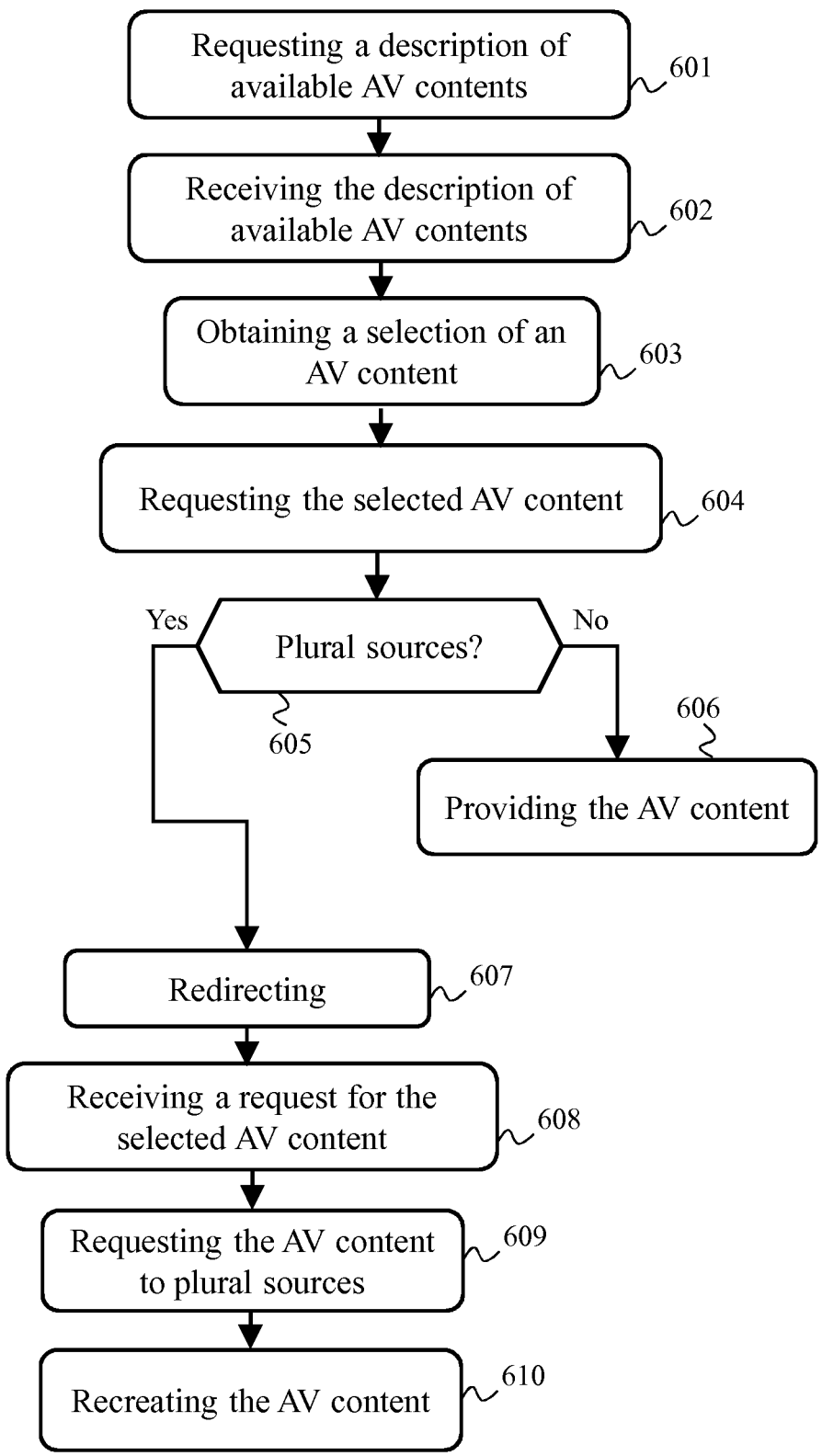

The characteristics of the invention will emerge more clearly from a reading of the following description of an example of embodiment, said description being produced with reference to the accompanying drawings, among which:

FIG. 1A schematically represents a first system according to the present invention;

FIG. 1B schematically represents a second system according to the present invention;

FIG. 2 schematically represents an architecture of devices of the system according to the present invention;

FIG. 3 schematically represents an algorithm for audio-visual content delivery according to the present invention;

FIG. 4 schematically represents an algorithm for audio-visual content delivery according to the present invention, in a multicast context;

FIG. 5 schematically represents an algorithm for audio-visual content delivery according to the present invention, in a HLS multicast context;

FIG. 6 schematically represents an algorithm for audio-visual content delivery according to the present invention, in a multi-source context.

In order to allow client devices to benefit from new CDN infrastructure or services in the context of an audio-visual content delivery, while limiting processing resources consumption, it is proposed to redirect requests addressed to an equipment, providing the audio-visual content, to an agent present in a network interconnecting device interconnecting a network to which the equipment is connected and a network to which the client device is connected. The agent, in response, acts as a relay between the equipment and at least one client device to which the audio-visual content delivery is intended. The redirecting of the requests allows reaching this goal without the agent having to snoop messages transferred via the interconnecting device, which limits processing resources consumption for the interconnecting device. Beyond the performance gain, a failure of the agent as proposed should have no impact on other services of the network interconnecting device, which would have not been the case if the agent had to snoop the messages transferred via the interconnecting device. When considering that the interconnecting device is a home gateway, a failure of such a snooping agent would result in shutting down the broadband connection. In this event, subscribers would have to suffer a loss of different critical services such as Voice over IP, data and television. Moreover, as the agent as proposed does not intercept all traffic getting through the network interconnecting device, no privacy/confidentiality issues should be raised.

FIG. 1A schematically represents a first system according to the present invention. The system comprises a network interconnecting device 101, such as a home gateway, adapted to interconnect a first network 110 and a second network 120. The system further comprises a portal server providing a web site via which a description of audio-visual (AV) contents is available through a CDN. The system further comprises a CDN server 112 from which the AV contents described via the web site can be accessed for being further displayed to a user. The CDN server 112 is adapted to deliver the AV contents on demand in a unicast way. The CDN server 112 is referenced in the aforementioned description of the AV contents as the device providing said AV contents. The system may further comprise additional servers, such as a multicast server 113 adapted to deliver some or all said AV contents in a multicast way. The portal server 111, the CDN server 112 and said additional servers are connected to the first network 110.

It should be noticed that the portal server 111, the CDN server 112 and said additional servers may correspond to functionalities implemented on a single hardware platform. In other words, the portal server 111, the CDN server 112 and the multicast server 113 constitute an equipment connected to the first network 110 and adapted to provide the AV content to client devices.

In a preferred embodiment, the CDN server 112 is adapted to deliver the AV contents using HLS, thus allowing implementing ABS. The same principles would however apply when the CDN server 112 is adapted to deliver the AV contents using Smooth Streaming, HDS or MPEG DASH.

In one embodiment, the multicast server 113 is adapted to deliver at least one AV content among said AV contents using RTP ("Real-time Transport Protocol", as defined by the normative document RFC 3550) over UDP ("User Datagram Protocol", as defined by the normative document RFC 768).

The network interconnecting device 101 interconnects the first network 110 and the second network 120, so that a client device 121 connected to the second network 120 can access services offered by the portal server 111, the CDN server 112 and said additional servers, via the network interconnecting device 101. The network interconnecting device 101 comprises an agent 102, acting as a relay between the CDN equipment and the client device 121. The behaviour of the agent 102 and of the CDN equipment is detailed hereafter with regard to FIGS. 3 to 6.

FIG. 1B schematically represents a second system according to the present invention. The system of FIG. 1B is similar to the system of FIG. 1A except that the multicast server 113 is replaced by plural AV servers 114, 115. Each AV server is able to deliver at least part of AV contents, potentially with different bitrates, i.e. layers. The AV servers 114, 115 considered as a whole are adapted to provide the full AV contents, but each AV server 114, 115, may be able to only a part of the AV contents or a subset of the layers available in the CDN for the AV contents. According to a first example, the AV server 114 is able to provide the AV contents in low resolution and the AV server 115 is able to provide the AV contents in high resolution. According to a second example, the AV server 114 is able to provide a portion of each AV content and the AV server 115 is able to provide the remaining portion of each AV content. According to a third example, each AV server 114, 115 is able to provide all the AV contents in low resolution and in high resolution. The AV servers 114, 115 can be used in conjunction in order to enhance the QoE from the user's standpoint during the delivery of AV contents and/or improve the load balancing on the first network 110.

FIGS. 1A and 1B shows arrows, in plain and dashed lines, representing data exchanges taking place during operation of the system and detailed hereafter with regard to FIGS. 3, 4 and 6.

FIG. 2 schematically represents an architecture of the network interconnecting device 101 and/or the portal server 111 and/or the CDN server 112 and/or the multicast server 113 and/or the AV servers 114, 115. Let's consider describing FIG. 2 with respect to the network interconnecting device 101.

According to the shown architecture, the network interconnecting device 101 comprises the following components interconnected by a communications bus 210: a processor, microprocessor, microcontroller or CPU (Central Processing Unit) 200; a RAM (Random-Access Memory) 201; a ROM (Read-Only Memory) 202; a HDD (Hard-Disk Drive) 203, or any other device adapted to read information stored on storage means; a first communication interface 204 and a second communication interface 205.

The first communication interface 204 allows the network interconnecting device 101 being connected to the first network 110. The second communication interface 205 allows the network interconnecting device 101 being connected to the second network 120. It should be noted that, considering the portal server 111 or the CDN server 112 or the multicast server 113, only one communication interface may be implemented, for connecting the concerned server to the first network 110.

CPU 200 is capable of executing instructions loaded into RAM 201 from ROM 202 or from an external memory, such as HDD 203. After the network interconnecting device 101 has been powered on, CPU 200 is capable of reading instructions from RAM 201 and executing these instructions. The instructions form one computer program that causes CPU 200 to perform the steps performed by the network interconnecting device 101 and described hereafter with regard to FIGS. 3 and 4. It should be noted that these steps may be implemented in software by execution of a set of instructions or program by a programmable computing machine, such as a PC, a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 schematically represents an algorithm for AV content delivery implemented by the system of FIG. 1A or 1B.

In a step 301, the client device 121 requests that the portal server 111 provides to the client device 121a description of AV contents made available via the CDN. The request is preferably performed in the form of a unicast HTTP request to an URL ("Uniform Resource Locator") which refers to said description of AV contents. The request is transmitted by the client device 121 to the portal server 111 via the network interconnecting device 101.

In a following step 302, the portal server 111 transmits, in response to the request transmitted in the step 301, the description of the AV contents made available via the CDN. The response is transmitted by the portal server 111 to the client device 121 via the network interconnecting device 101. The description comprises a list of said AV contents, as well as respective URLs at which the respective AV contents can be obtained from the CDN server 112. The description may further comprise thumbnails of images extracted from the respective AV contents or of pictures representative of said respective AV contents, which allows the client device 121 to display on a graphical user interface (GUI) a tile built from said thumbnails.

The messages exchange related to the execution of the steps 301 and 302 is represented with the arrows 131 in FIG. 1A and 141 in FIG. 1B.

In a following step 303, the client device 121 obtains from the user, via a user interface, a selection of an AV content among the list of available AV contents.

It shall be noted that, in a more general embodiment, the selection of the AV content may be automatically performed, without execution of the steps 301 and 302. For instance, the client device 121 receives in a message, such as an e-mail, an URL pointing on the AV content provided by the CDN server 112.

In a following step 304, the client device 121 requests the selected AV content to the CDN server 112. The request is preferably in the form of an HTTP GET message referring to a playlist file with an m3u8 extension.

In a following step 305, the CDN server 112 checks whether the AV content is concerned by a new infrastructure or new services, for which the client device 121 is expected to be non-compatible.

When the selected AV content is concerned by a new infrastructure or new services, then a step 307 is performed. Otherwise, a step 306 is performed.

In the step 306, the CDN server 112 provides the selected AV content to the client device 121 via the network interconnecting device 101. Preferably, the AV content is delivered by the CDN server 112 using the HLS technology, i.e. in a sequence of small HTTP-based file downloads, each containing a chunk of a transport stream representative of the AV content. The downloads are performed on a unicast HTTP request-response basis. Then the algorithm ends.

In the step 307, the CDN server 112 transmits to the client device 121 a redirecting message indicating that the client device 121 is redirected to another location identified by a TCP couple of IP ("Internet Protocol", as defined by the normative document RFC 791) address and port. The TCP couple of IP address and port is managed by the agent 102 of the interconnecting device 101.

The redirecting message preferably indicates a temporary relocation of the audio-visual content. Indicating that the requested resource resides temporarily at a different location allows, when the client device 121 would make a later attempt to get the AV content, ensuring that the client device 121 contact again the CDN server 112. Therefore, the CDN server 112 is able to check whether the AV content is still concerned by a new infrastructure or new services, for which the client device 121 is expected to be non-compatible.

The messages exchange related to the execution of the steps 304, 306 and 307 is represented with the arrows 132 in FIG. 1A and 142 in FIG. 1B.

In a following step 308, upon receiving the redirecting message, the client device 121 generates a connection request toward the TCP couple of IP address and port indicated in the redirecting message. The request contains the parameters provided in the redirecting message.

The transmission of this message related to the execution of the steps 308 is represented with the arrows 133 in FIG. 1A and 143 in FIG. 1B.

In a following step 309, the agent 102 acts as a relay between the CDN equipment and the client device 121. Therefore the client device 121 interacts with the agent 102 as if the device 121 were interacting with the CDN server 112, and the agent 102 enables the implementation of the new infrastructure or new services.

According to a first embodiment, the new infrastructure or new services concerns the implementation of multicast transmissions of AV contents in live streaming throughout the CDN network. This embodiment is detailed hereafter with regard to FIG. 4. According to a second embodiment, the new infrastructure or new services concerns the implementation of plural sources from which the agent 102 is able to retrieve the AV contents. This embodiment is detailed hereafter with regard to FIG. 6.

FIG. 4 schematically represents an algorithm for AV content delivery implemented by the system of FIG. 1A in which the multicast server 113 is active. The algorithm allows client devices to benefit from new CDN infrastructure or services aiming at reducing the bandwidth consumption on the first network 100.

The algorithm starts with steps 401 to 404 that are respectively identical to the steps 301 to 304 already described with regard to FIG. 3, except that the description of the AV contents made available via the CDN only lists AV contents available as live streaming.

In a following step 405, the CDN server 112 checks whether the AV content is available in multicast form from the multicast server 113. According to a first example, the CDN server 112 stores a predefined list of AV contents that are available as live streaming and in multicast form from the multicast server 113. According to a second example, all AV contents available in multicast streaming being associated with respective unique identifiers, the CDN server 112 provides the unique identifier of the selected AV content to the multicast server 113 and the multicast server 113 transmits a response indicating whether a multicast transmission is already setup, or whether the multicast server 113 has the ability to setup such a multicast transmission, for the identified AV content.

When the selected AV content is made available in multicast form, a step 407 is performed. Otherwise, a step 406 is performed.

In the step 406, the CDN server 112 provides the selected AV content in unicast form to the client device 121 via the network interconnecting device 101.

In the step 407, the CDN server 112 transmits to the client device 121 a redirecting message indicating that the client device 121 is redirected to another location, as already described with regard to the step 307.

The redirecting message may take the following form:
307 TEMPORARY REDIRECT
location:192.168.0.1:5000?225.10.11.12:1000&NbLayers=3
wherein:
307 TEMPORARY REDIRECT corresponds to an HTTP code indicating that the requested resource resides temporarily at a different location and that, since the redirection may be altered on occasion, the client device 121 should continue using the preceding URL for future requests;
location: 192.168.0.1:5000 indicates the temporary location of the resource, 192.168.0.1 being the IP address of the agent 102 and 5000 being the TCP port to which the client device 121 shall perform a connection;
? indicates that parameters follow;
225.10.11.12:1000&NbLayers=3 are said parameters needed by the agent 102, 225.10.11.12 being the IP multicast address for the multicast stream representative of the requested AV content, 1000 being the UDP port to which the agent 102 shall listen and NbLayers=3 indicates the quantity of layers available for the requested AV content.

It should be noted that indicating a value for the parameter NbLayers is only useful in case of ABS, and moreover when the quantity of layers is not a priori known by the agent 102.

In a following step 408, upon receiving the redirecting message, the client device 121 generates a connection request toward the TCP couple of IP address and port indicated in the redirecting message. The request contains the parameters provided in the redirecting message.

In a following step 409, the agent 102 joins the multicast stream, which port and address are specified in the request received from the client device 121. Then the agent 102 receives the multicast stream from the multicast server 113. Joining the multicast stream is preferably performed using a dedicated IGMP ("Internet Group Management Protocol", as defined by the normative document RFC 3376) message.

The data transmission in multicast form of the selected AV content is represented with an arrow 134 in FIG. 1A.

In a following step 410, the agent 102 performs a multicast-to-unicast conversion. From the received multicast packets, the agent 102 generates respective unicast responses to requests transmitted by the client device 121. Indeed, to get the selected AV content, the client device 121 generates requests toward the agent 102 for obtaining the selected AV content by pieces. The agent 102 generates responses to said requests with AV data of the multicast stream received from the multicast server 113.

The data transmission in unicast form of the selected AV content is represented with an arrow 135 in FIG. 1A.

According to a particular embodiment, plural layers being made available by the multicast server 113 for the delivery of the selected AV content, the redirecting message includes a couple of multicast address and associated port for each layer. The agent 102 is then able to join any or all of the multicast streams for the selected AV content.

According to another particular embodiment, plural layers being made available by the multicast server 113 for the delivery of the selected AV content, the redirecting message doesn't include any multicast address and associated port. In this case, the multicast address and associated port for any multicast stream are known beforehand by the agent 102. For instance, such multicast address and associated port are predefined, or transmitted by the CDN server 112 to the interconnecting device 101 in a dedicated message in association with the unique identifier of the selected AV content and the redirecting message includes said unique identifier.

According to yet another particular embodiment, plural layers being made available by the multicast server 113 for the delivery of the selected AV content, the agent 102 determines at least one multicast address and/or at least one associated port, for joining the multicast stream(s), as a function of a quantity of layers indicated in the redirecting message for the selected AV content. For instance, a multicast address for one layer being included in the redirecting message, the agent 102 may determine another multicast address for another layer by modifying said included multicast address in a predetermined way. As an example, the redirecting message includes the multicast address 225.10.11.12, which corresponds to one layer, and the agent 102 knows that, by incrementing by one unit this address, said agent 102 obtains the multicast address 225.10.11.13, which corresponds to another layer. The value of the parameter NbLayers may indicate up to which address increments can be performed. The same principle applies for the associated port. As an example, the redirecting message includes the port 1000, which corresponds to one layer, and the agent 102 knows that, by incrementing by one unit this port, said agent 102 obtains the port 1001, which corresponds to another layer. It can be seen from these examples, that one multicast address for all layers and one associated port per layer can be used, or one multicast address per layer and one associated port per layer can be used or one multicast address per layer and one associated port for all layers can be used.

FIG. 5 schematically details the steps 408 to 410 performed by the agent 102 in a multicast HLS context.

In a step 401, the agent 102 receives a request from the client device 121 to get the playlist for the various streams which are available for the selected AV content. This request is the one received in the step 408 and thus potentially comprises parameters coming from the redirecting message.

In a following step 502, the agent 102 requests from the CDN server 112 said playlist, the URL used to achieve this being a priori known by the agent 102 or provided as a parameter in the redirecting message. At least the redirecting message includes parameters representative of said Uniform Resource Locator. In a following step 503, the agent 102 receives the playlist from the CDN server 112, said playlist referring to layer playlists, one per layer, such as: "low.m3u8", "medium.m3u8" and "high.m3u8".

In a following step 504, the agent 102 parses the playlist provided by the CDN server 112 to determine the playlist applicable for each layer, and therefore for determining the concerned multicast stream.

In a following step 505, the agent 102 transmits to the client device 121 the playlist received from the CDN server 112.

When the client device 121 requests a layer playlist in a following step 506, e.g. "low.m3u8", the agent 102 performs the join operation of the step 409. The agent 102 may determine which multicast stream(s) to join using the position, in the playlist received from the CDN server 112, of the layer playlist requested by the client device 121.

In response to the join operation, in a following step 507, the agent 102 starts receiving the multicast stream(s) from the multicast server 113, which include(s) the layer playlist for the concerned layer, e.g. "low.m3u8", and AV data.

In a following step 508, the agent 102 parses the layer playlist(s) included in the multicast stream(s) to determine the identifiers of all the files composing the AV stream for the considered layer.

In a following step 509, the agent 102 transmits to the client device 121 the layer playlist(s) included in the multicast stream(s). Then the client device 121 is expected to generate requests toward the agent 102 for obtaining the selected AV content by pieces, as already described. In response, the agent 102 performs the multicast-to-unicast conversion of the step 410.

When the client device 121 detects a need to switch to another layer, the client device 121 transmits, in a following step 510, a request for obtaining the concerned playlist, e.g. "medium.m3u8". It results in the agent 102 selecting a multicast stream as a function of said another playlist requested by the client device 121. Once all layer playlists are known by the client device 121, the client device 121 may request a file download from any layer playlist, using an identifier of said file. The agent 102 is able to select a multicast stream as a function of said identifier of said file, thanks to the parsing operation performed beforehand on the layer playlists.

Once the converted stream data are transmitted to the client device 121, the algorithm reiterates the step 506, wherein the client device 121 requests again a playlist. Indeed, in a live streaming context in HLS, the playlist evolve over time: outdated chunks are removed and new chunks are added. The agent 102 provides the up-to-date playlist to the client device 121 and selects another multicast stream only when a switch in between layers has to be performed.

In the context of Smooth Streaming, the implementation is simpler as the request from the client device 121 indicates the concerned layer and the time reference of the requested AV file piece.

From the explanation above with regard to FIG. 5, it can be understood that the client device 121 is in charge of detecting a need to switch from one layer to another.

According to another particular embodiment, plural layers being made available by the multicast server 113 for the delivery of the selected AV content, the agent 102 having joined one multicast stream corresponding to one layer, the agent 102 detects a need for the client device 121 to switch from said one layer to another layer. Then the agent 102 joins a multicast stream corresponding to said another layer and leaves the multicast stream corresponding to said one layer. Leaving a multicast stream is preferably performed using a dedicated IGMP message. The agent 102 is thus not in a situation where the agent 102 needs to be simultaneously joined to plural multicast streams, or only for a short period of time in order to perform the switch from one layer to another.

According to yet another particular embodiment, plural layers being made available by the multicast server 113 for the delivery of the selected AV content, the agent 102 having joined at least two multicast streams corresponding respectively to one layer and another layer, the agent 102 detects a need for the client device 121 to switch from said one layer to another layer. Then the agent 102 selects data from one multicast stream among said at least two multicast streams, as a function of said detected need. It means that the agent 102 receives the data from both multicast streams and internally selects the appropriate data to be provided in unicast form to the client device 121.

According to yet another particular embodiment, detecting a need for the client device 121 to switch from one layer to another layer is performed by the agent 102 on its own, for instance on the basis of monitoring traffic load in the first network 110. Another approach is that the multicast server 113 informs the agent 102 that there is a need to perform such a switch.

FIG. 6 schematically represents an algorithm for AV content delivery implemented by the system of FIG. 1B in which the AV servers 114, 115 are active. The algorithm allows client devices to benefit from new CDN infrastructure or services aiming at improving the QoE from the user's standpoint and/or at improving the load balancing on the first network 100.

The algorithm starts with steps 601 to 604 that are respectively identical to the steps 301 to 304 already described with regard to FIG. 3. The description of the AV contents made available via the CDN lists AV contents available as live streaming and/or as VOD (Video On-Demand).

In a following step 605, the CDN server 112 checks whether the AV content is available from plural sources. According to a first example, the CDN server 112 stores a predefined list of sources from which AV contents are available. According to a second example, all AV contents being associated with respective unique identifiers, the CDN server 112 provides the unique identifier of the selected AV content to the AV servers 114, 115 and the AV servers 114, 115 transmit responses indicating whether the identified AV content is at least partially stored by the AV servers 114, 115.

When the selected AV content is made available from plural sources, a step 607 is performed. Otherwise, a step 606 is performed.

In the step 606, the CDN server 112 provides the selected AV content in unicast form to the client device 121 via the network interconnecting device 101.

In the step 607, the CDN server 112 transmits to the client device 121 a redirecting message indicating that the client device 121 is redirected to another location, as already described with regard to the step 307. The redirecting message may further contain an indication of an URL representative of each source from which the agent 102 can request the selected AV content. The redirecting message may further contain an indication of which chunk of the selected AV content each source stores. These indications may also be predefined in the agent 102.

In a following step 608, upon receiving the redirecting message, the client device 121 generates a connection request toward the TCP couple of IP address and port indicated in the redirecting message. The request contains the parameters provided in the redirecting message.

In a following step 609, the agent 102 requests and receives the selected AV content from plural source. Requesting a same chunk to plural sources allows increasing the QoE, as it reduces the overall latency to obtain the chunks, which avoids shortage of AV data and thus AV artefacts. It further allows overcoming connection loss impacts with one source, also referred to as host, on QoE during the delivery of the AV data. Requesting different chunks to respective different sources allows improving the load balancing on the CDN network.

Exchanges enabling the agent 102 to receives pieces of the selected AV content are represented by arrows 144, 145 in FIG. 1B.

In a following step 610, the agent 102 recreates the selected AV content and transmits the AV content in unicast form to the client device 121.

The data transmission in unicast form of the selected AV content is represented with an arrow 135 in FIG. 1B.

According to a particular embodiment, plural layers can be made available for the selected AV content. In the context of HLS, the agent 102 requests from the CDN server 112 the concerned playlists, the URL used to achieve this being a priori known by the agent 102 or provided as a parameter in the redirecting message. One or more of said playlists may be also obtained from the AV servers 114, 115.

According to another particular embodiment, in the context of VOD, the interconnecting device 101 is a home gateway and the agent 102 obtains the AV contents from plural sources, which are other home gateways. Said other home gateways have access to at least part of the AV content, which may be stored by said other home gateways or another storage unit present on the local area networks interconnected to the Internet by said other home gateways. The AV content is accessible by said other home gateways when said AV content has been downloaded beforehand for a user of a client device present on the local area networks interconnected to the Internet by said other home gateways. The CDN server 112 may keep traces of the home gateways via which the AV content is downloaded, in order to inform the agent 102 about where the AV content can be obtained. Such a particular embodiment allows further improving the load balancing on the CDN.

The invention claimed is:

1. A method for delivering an audio-visual content to a client device, an interconnecting device interconnecting a first network to a second network, the client device being connected to the second network, an equipment storing the audio-visual content and adapted to provide the audio-visual content being connected to the first network, wherein said equipment performs:
   receiving, from the client device, a first request for receiving the audio-visual content;
   transmitting a redirecting message to the client device, said redirecting message redirecting the client device toward an agent implemented in the interconnecting device, the redirecting message indicating a relocation of the audio-visual content; and
   wherein said agent performs:
   receiving, from the client device, a second request for receiving the audio-visual content; and
   acting as a relay between said equipment and the client device, in response to said second request, and
   wherein the redirecting message indicates a temporary relocation of the audio-visual content so that, when the client device makes a later attempt to get the audio-visual content the client device contacts again said equipment.

2. The method according to claim 1, wherein said first and second requests are requests for receiving the audio-visual content in the form of a unicast stream, in that said equipment is adapted to provide the audio-visual content in live streaming, in that said equipment transmits the redirecting message to the client device when the audio-visual content is made available by said equipment in the form of at least one multicast stream, and wherein, when acting as a relay, said agent performs:
   joining said at least one multicast stream; and
   converting data received in the form of the at least one multicast stream into data in the form of the unicast stream.

3. The method according to claim 2, wherein:
   the redirecting message includes parameters notifying at least one multicast address and at least one associated port;

the request for receiving the audio-visual content in the form of the unicast stream comprises said parameters notifying the at least one multicast address and the at least one associated port;

and wherein said agent joins at least one multicast stream corresponding to the at least one multicast address and the at least one associated port.

4. The method according to claim 3, wherein:

the redirecting message includes parameters notifying a quantity of layers made available for the audio-visual content in the form of at least one multicast stream;

the request for receiving the audio-visual content in the form of the unicast stream includes said parameters notifying the quantity of layers;

and wherein said agent determines at least one multicast address and/or at least one associated port, as a function of said quantity of layers.

5. The method according to claim 4, wherein:

the redirecting message includes parameters notifying one multicast address and one associated port and notifying said quantity of layers;

the request for receiving the audio-visual content in the form of the unicast stream includes said parameters notifying said one multicast address and said one associated port and notifying said quantity of layers;

and wherein said agent determines one multicast address per layer and one associated port, as a function of said quantity of layers and of said one multicast address and said one associated port included in said request.

6. The method according to claim 4, wherein:

the redirecting message includes parameters notifying one multicast address and one associated port and notifying said quantity of layers;

the request for receiving the audio-visual content in the form of the unicast stream includes said parameters notifying said one multicast address and said one associated port and notifying said quantity of layers;

and wherein said agent determines one multicast address for all layers and one associated port per layer, as a function of said quantity of layers and of said one multicast address and said one associated port included in said request.

7. The method according to claim 2, wherein, plural layers being made available for the audio-visual content in the form of at least one multicast stream, said equipment being adapted to provide the audio-visual content using HyperText Transfer Protocol Live Streaming, and wherein:

the redirecting message includes parameters representative of a Uniform Resource Locator related to a playlist for the audio-visual content;

the request for receiving the audio-visual content in the form of the unicast stream includes said parameters representative of the Uniform Resource Locator;

and wherein said agent performs:
  requesting said playlist on the basis of said Uniform Resource Locator;
  receiving said playlist;
  performing a parsing operation on said playlist for determining one playlist associated with each layer;
  receiving one layer playlist from each joined multicast stream;
  transmitting said received playlist(s) to the client device;
  receiving a request, from the client device, indicating a playlist associated with one layer or indicating a file of a playlist associated with one layer; and
  selecting a multicast stream as a function of said indicated playlist associated with one layer or of said indicated file.

8. The method according to claim 2, wherein, plural layers being made available for the audio-visual content in the form of at least one multicast stream, the agent having joined one multicast stream corresponding to one layer, said agent performs:

detecting a need for the client device to switch from said one layer to another layer;

joining a multicast stream corresponding to said another layer; and leaving the multicast stream corresponding to said one layer.

9. The method according to claim 2, wherein, plural layers being made available for the audio-visual content in the form of at least one multicast stream, the agent having joined at least two multicast streams corresponding respectively to one layer and another layer, said agent performs:

detecting a need for the client device to switch in between layers; and selecting data from one multicast stream among said at least two multicast streams, as a function of said detected need.

10. The method according to claim 1, wherein said first and second requests are requests for receiving the audio-visual content in the form of a unicast stream, in that said equipment transmits the redirecting message to the client device when the audio-visual content is made available by plural sources, and wherein, when acting as a relay said agent performs:

requesting said audio-visual content from said plural sources; and recreating a unicast stream from data received from said plural sources.

11. The method according to claim 10, wherein:

the redirecting message includes parameters notifying from which sources the audio-visual content is made available; and the request for receiving the audio-visual content in the form of the unicast stream comprises said parameters.

12. The method according to claim 10, wherein said interconnecting device is a home gateway and said plural sources are servers of said equipment and/or other home gateways.

13. A system for delivering an audio-visual content to a client device, said system comprising an equipment and an interconnecting device, said interconnecting device aiming at interconnecting a first network to a second network, the client device being connected to the second network, said equipment storing the audio-visual content and being adapted to provide the audio-visual content and aiming at being connected to the first network, wherein said equipment comprises:

a receiver for receiving a first request for receiving the audio-visual content;

a transmitter for transmitting a redirecting message, said redirecting message redirecting the client device toward an agent implemented in the interconnecting device, the redirecting message indicating a relocation of the audio-visual content; and wherein said agent comprises:
  a receiver for receiving a second request for receiving the audio-visual content; and
  wherein said agent is configured for acting as a relay between said equipment and the client device, in response to said second request, and wherein the redirecting message indicates a temporary relocation of the audio-visual content so that, when the client device makes a later attempt to get the audio-visual content, the client device contacts again said equipment.

\* \* \* \* \*